United States Patent [19]

Giezeman et al.

[11] Patent Number: 4,713,674
[45] Date of Patent: Dec. 15, 1987

[54] EXPOSURE DEVICE FOR SHEETS

[75] Inventors: Paulus G. Giezeman, Belfeld; Gerhardus E. Romualdus Ter Horst, Al Grubbenvorst, both of Netherlands

[73] Assignee: OCE-Nederland B.V., Venlo, Netherlands

[21] Appl. No.: 847,633

[22] Filed: Apr. 3, 1986

[30] Foreign Application Priority Data

Apr. 4, 1985 [NL] Netherlands ............... 8500995

[51] Int. Cl.$^4$ ............................................. G03G 15/00
[52] U.S. Cl. ................................. 355/14 SH; 355/3 R; 355/14 R; 355/14 E; 271/3.1; 271/227
[58] Field of Search ............... 355/3 R, 14 R, 14 E, 355/14 SH, 3 SH; 271/227, 250, 3.1, 4, 301

[56] References Cited

U.S. PATENT DOCUMENTS

| 4,478,405 | 10/1984 | Eertink et al. | 271/227 |
|---|---|---|---|
| 4,538,905 | 9/1985 | Griego et al. | 355/14 SH |
| 4,568,181 | 2/1986 | Nishiyama | 355/14 SH X |
| 4,579,444 | 4/1986 | Pinckney et al. | 355/14 SH |
| 4,585,332 | 4/1986 | Shenoy | 355/14 SH X |
| 4,634,263 | 1/1987 | Miwa | 355/14 SH |
| 4,634,265 | 1/1987 | Tada | 355/14 SH X |

Primary Examiner—A. C. Prescott
Attorney, Agent, or Firm—Reed Smith Shaw & McClay

[57] ABSTRACT

Exposure device for originals comprising an endless conveyor path for passing an original repeatedly through an exposure zone either by continuously conveying the original in one direction through the endless path or by conveying that original successively in opposite direction through the endless path. Detectors are provided for selecting the appropriate conveying by measuring the length of a original introduced into the path. When it is determined that the length of original is smaller than a predetermined value smaller than the length of the endless path, or is larger than the endless path, the original after being exposed is conveyed in an opposite direction, past the exposure zone until it reaches the initial exposure situation again. When it is determined that the length of an original introduced is between said predetermined value and the length of the endless path, the original is conveyed continuously in the same direction for carrying out a succession of exposures. The predetermined value is set so that an original, irrespective of its length, will be exposed in the fastest succession.

10 Claims, 5 Drawing Figures

EXPOSURE DEVICE FOR SHEETS

FIELD OF THE INVENTION

The present invention relates to an exposure device and, in particular, to a means for controlling the time required to performing successive exposures of a original introduced to an exposure station in a copying machine.

BACKGROUND OF THE INVENTION

This invention relates generally to exposure means for originals, positioned along an endless conveyor path. The conveyor means typically passes originals through the conveyor for exposure thereof onto a photoconductor, for example. Drive means are provided to enable repeated passes of the original in one direction. Means are also provided for introducing the original into the conveyor path and for selectively discharging the original from the conveyor path. It is known to include measuring means to determine whether the length of the original that has been introduced is larger or smaller than a predetermined value and to deliver a control signal when the length is smaller.

For example, such an exposure device is disclosed in United Kingdom Pat. No. 1,262,329. That patent describes a device having a second, shorter endless conveyor path which in its exposure station coincides with the longer endless conveyor path. An original is introduced into the shorter path and circulated therein for successive exposures when the measuring means detects an original of a length shorter than the second path.

With this device, it is possible to make a number of exposures without interruption for only those originals having a length corresponding to the length of the endless conveyor path. If the second path is long, the interruptions will be relatively long, resulting in a relatively short exposure time. On the other hand, if the second path is short, only the shortest originals can use the path, while all the longer originals must make use of the much longer endless path corresponding to the length of the longest original, resulting in long interruptions between the successive exposures. This is particularly a problem in the case of relatively short originals.

While is is possible to shorten the length of the conveyor path, the minimum length of an endless conveyor path cannot be made much smaller than about 60 cm, because of the space required to locate the conveyor means, exposure means, and original positioning mechanisms along the path. It is well known that current exposure devices are not well suited for originals shorter than 60 cm, such as, e.g., an original of A3 or A4 size.

Accordingly, it is an object of the present invention to provide an exposure device of the kind referred to above without the limitations of the known exposure device.

SUMMARY OF THE INVENTION

The present invention includes an endless conveyor having introduction and discharge means and drive means which can repeatedly cause originals positioned on the conveyor to pass through an exposure station. A measuring means is provided for determining the length of the original to be exposed and to provide a control signal. A control means is provided which is responsive to the control for effecting the driving of the conveyor.

The conveyor drive means is capable of being reversed so as to drive the conveyor means in the opposite direction. The conveyor control means causes a change in direction at the time when the original has passed the exposure station and maintains the changed direction during the time required to return that entire original back through the exposure station.

The effect of this is that originals of a length shorter than the length of the endless path can be exposed in rapid succession irrespective of their lengths.

Preferably, the exposure device according to the invention also includes a conveyor path which follows on the endless conveyor path, a deflector element which can guide into the following conveyor path an original fed into the endless conveyor path, and adjusting means for actuating the deflector element. In this preferred embodiment the control means also delivers a control signal when the adjusting means has been actuated. The advantage of this arrangement is that originals longer than the circumference of the endless conveyor path can be automatically and repeatedly passed through the exposure station for exposure purposes.

Preferably, the speed at which the conveyor means takes an exposed original back through the exposure station is greater than the speed at which the conveyor means conveys an original during the exposure in the direction of passage. In this way the originals returned along the exposure station can be exposed in even faster succession.

In an other embodiment, the measuring means comprise a first detector which is positioned at an exit of the exposure station for delivering a first signal in response to the passage of the trailing edge of an original leaving the exposure station. A second detector is situated a distance L after the exposure station in the direction of movement of said original for providing a second signal in response to the leading edge of the original where:

$$L = \frac{V_1}{V_1 + V_2} S - R.$$

where $V_1$ is the speed of passage, $V_2$ the return speed, $S$ the length of the endless conveyor path and $R$ the length of the exposure station. A circuit connected to the first detector and second detector is included to deliver the control signal if a first signal is generated in the absence of the second signal. This control signal is delivered at the time when the reversal of movement of the original takes place so that no means are required for the delayed transmission of the control signal to the means which reverses the direction of drive of the conveyor means.

It should be noted, however, that it is known per se, e.g., United Kingdom Pat. No. 1,211,326, to pass a original back and forth through an exposure station in order to carry out a plurality of exposures. The known exposure device has the disadvantage that not all originals can be exposed in rapid succession irrespective of their lengths; rather, it applies for long originals which first have to move back over the same long distance in order to be subjected to a subsequent exposure.

Other features and advantages of the invention will be apparent from the following description of the presently preferred embodiments taken in connection with the accompanying drawings.

PRESENTLY PREFERRED EMBODIMENTS

Figure 1:
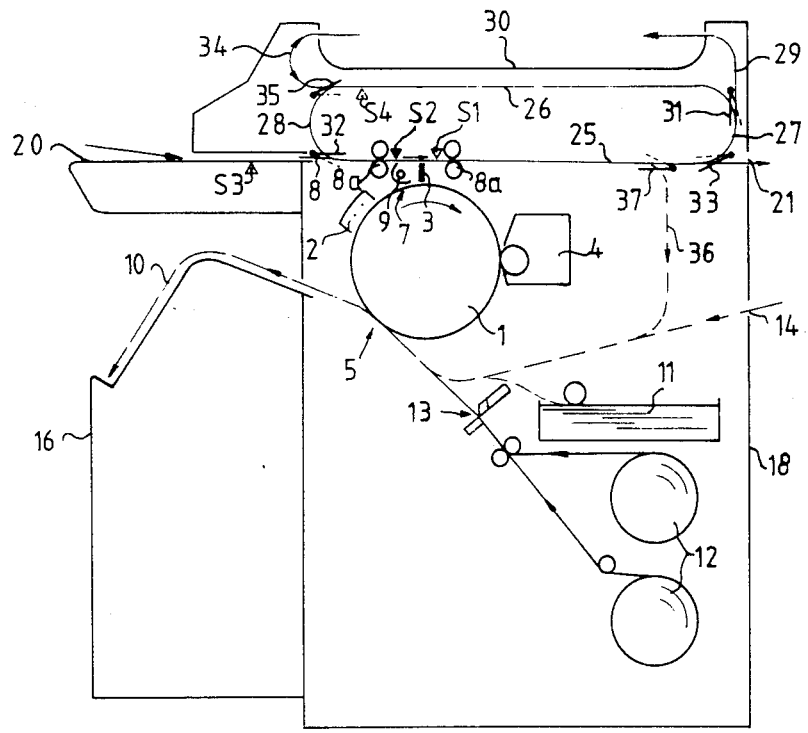
FIG. 1 is a diagrammatic cross-section of a copying machine having an exposure device according to the invention.
Figure 2:
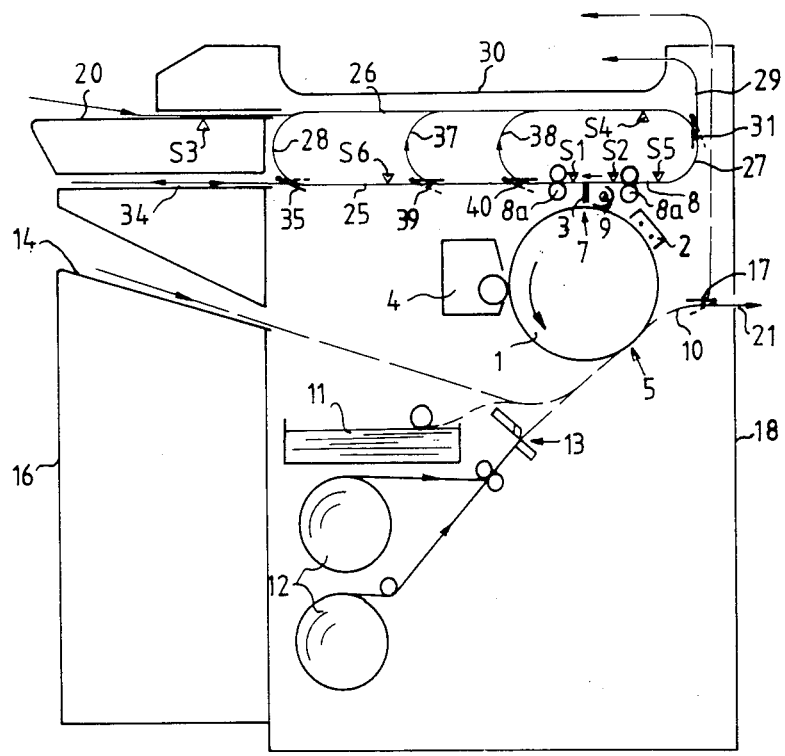
FIG. 2 is a diagrammatic cross-section of a copying machine having another exposure device according to the invention.
Figure 3:
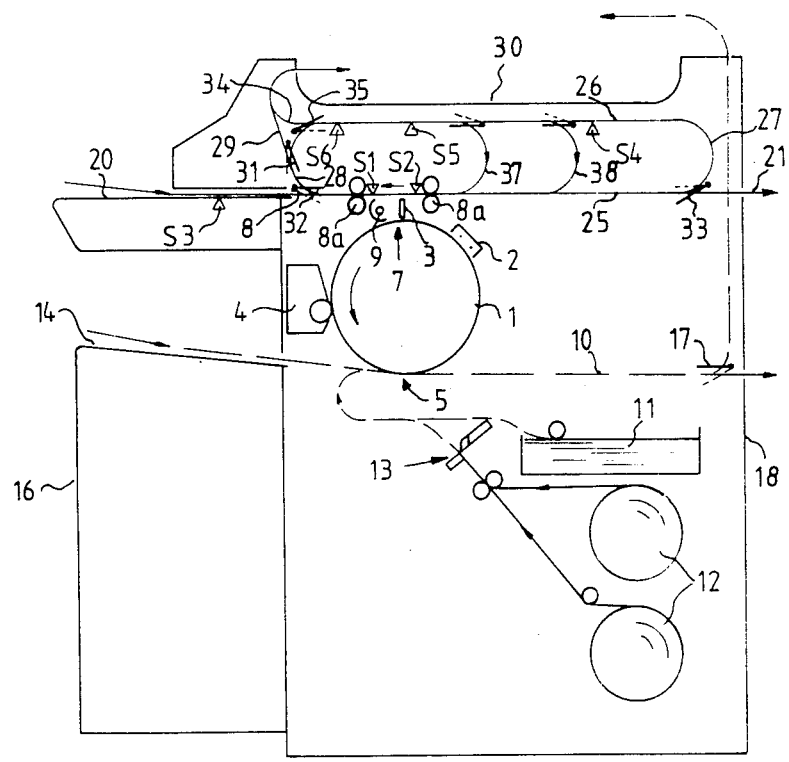
FIG. 3 is a diagrammatic cross-section of a copying machine having yet another exposure device according to the invention.

The illustrative copying machines show in FIGS. 1–3 each comprise a photoconductive drum 1 which can rotate in the direction indicated by the arrow. Along the circumference of drum 1 is disposed charging device 2, imaging device 3, developing device 4, and an image transfer means 5. Imaging device 3 typically consists of an optical array, e.g., a SELFOC fiber array. On the side of the array remote from photoconductive drum 1 is disposed exposure device 7 comprising conveyor path 8 for the delivery of the original to be copied. Path 8 includes pairs of conveyor rollers 8a and lamp 9. An original fed through conveyor 8 in the direction indicated by the arrow is illuminated by lamp 9 and stripwise imaged as an erect image by the optical array on the rotating photoconductive drum 1 charged by charging device 2. The resulting charge image is developed by developing device 4 as the photoconductive drum 1 continues to rotate, and this developed image is directly transferred, in the image transfer device 5, to a sheet 10 of copy material 10 on which the image is fixed. Sheet 10 is supplied from sheet pile 11 or from a supply reel of copy material 12 in web form from which the sheet is cut to the desired length by cutter 13.

A sheet 10 of copy material can also be introduced manually via opening 14 provided for that purpose in the machine. In the copying machine represented in FIG. 1, the copy formed on sheet 10 is discharged from the machine at side 16, which is the operating side of the machine, beneath the place where the originals for copying are introduced into and discharged from the machine. In the copying machines represented in FIGS. 2 and 3, the resulting copy is discharged either at side 18 situated opposite operating side 16 of the machine, or in a collecting tray at the top of the machine, depending upon the position of the deflector 17.

The above description of generally known components of copying machines is sufficient for an understanding of a copying machine in which the exposure device according to the invention can be used.

Various embodiments of an exposure device according to the invention are described below with reference to FIGS. 1, 2 and 3, respectively.

Exposure device 7 shown in FIG. 1 comprises conveyor path 8 which extends from introduction table 20 at the operating side 16 of the copying machine horizontally to discharge aperture 21 formed in the opposite side 18 of the copying machine. The pairs of conveyor rollers 8a with the exposure zone situated therebetween are situated near operating side 16 in conveyor path 8.

During imaging, an original introduced from table 20 into conveyor path 8 is passed through the exposure zone in the direction indicated by the arrow by conveyor rollers 8a. The direction of rotation of conveyor rollers 8a is reversible so that the original can be directed back through the exposure zone in the opposite direction, as explained hereinafter. However, no imaging takes place during the return movement.

Exposure device 7 comprises an endless conveyor path consisting of two straight path portions, 25 and 26, respectively, situated one above the other and two semi-curved path portions, 27 and 28, respectively, which interconnect the straight path portions. The bottom portion 25 coincides with conveyor path 8 which extends through the exposure zone. On the opposite side of the machine from introduction table 20 is curved path portion 27 followed by conveyor path 29 which leads to receiving tray 30 for originals at the top of the copying machine. The connection between the conveyor paths is such that an original moving through the endless conveyor path in the direction of the arrow is discharged or remains in the endless conveyor path depending upon the position of deflector 31.

Where the introduction path along the introduction table 20 connects the endless conveyor path there is disposed a deflector 32 which, when in the position indicated by the solid lines, allows an original to be fed from introduction table 20 into the endless path, but which while in the position shown in broken lines permits an original supplied by rollers 8a in the direction opposite to the direction of the arrow to be passed from the bottom path portion 25 into the curved path portion 28.

A deflector 33 is positioned at the connection between the endless path and the discharge path leading to opening 21 at the back 18 of the copying machine. Also, a deflector 35 is provided at the connection between the top path portion 26, near the curved path portion 28, and discharge path 34 which also leads to receiving tray 30. Depending upon the positions of the respective deflectors 33 and 35, an original passing in the direction of the arrow will either be guided into a discharge path or held in the endless path by deflectors 33 and 35. Detectors $S_1$ and $S_2$ are provided in that part of the conveyor path which is situated between the conveyor rollers pairs 8a. Detector $S_1$ is positioned to react to the trailing edge of an original moving in the direction of the arrow and detector $S_2$ is positioned to react to the trailing edge of an original moving in the direction opposite to the direction of the arrow. At the introduction table 20 there is provided a third detector $S_3$ which is adapted to react to the leading and trailing edges of an original introduced over table 20. In the top straight path portion 26 of the endless path a detector $S_4$, is located a distance L from detector $S_1$ measured along the endless conveyor path in the direction of the arrow.

Distance $$L = \frac{V_1}{V_1 + V_2} \cdot S - R$$

where:

$V_1$ is the speed at which an original is passed through the endless conveyor path in the direction of the arrow;

$V_2$ is the speed at which the original is passed through the endless conveyor path in the direction opposite to the direction of the arrow;

S is the length of the endless conveyor path; and

R is the distance between the detectors $S_1$ and $S_2$, which corresponds to the length of the exposure station.

The distance between the detectors $S_3$ and $S_4$, as measured along the continuous path of which the curved path portion 27 forms part corresponds to the length of the endless conveyor path.

Speeds $V_1$ and $V_2$ are the average speeds at which the original moves through the endless conveyor path. At the beginning and end of each movement, the conveyor rollers' drive speed in the endless path gradually increases and decreases respectively in order to avoid acceleration forces which might cause an original to slip with respect to the rollers.

Figure 1A:
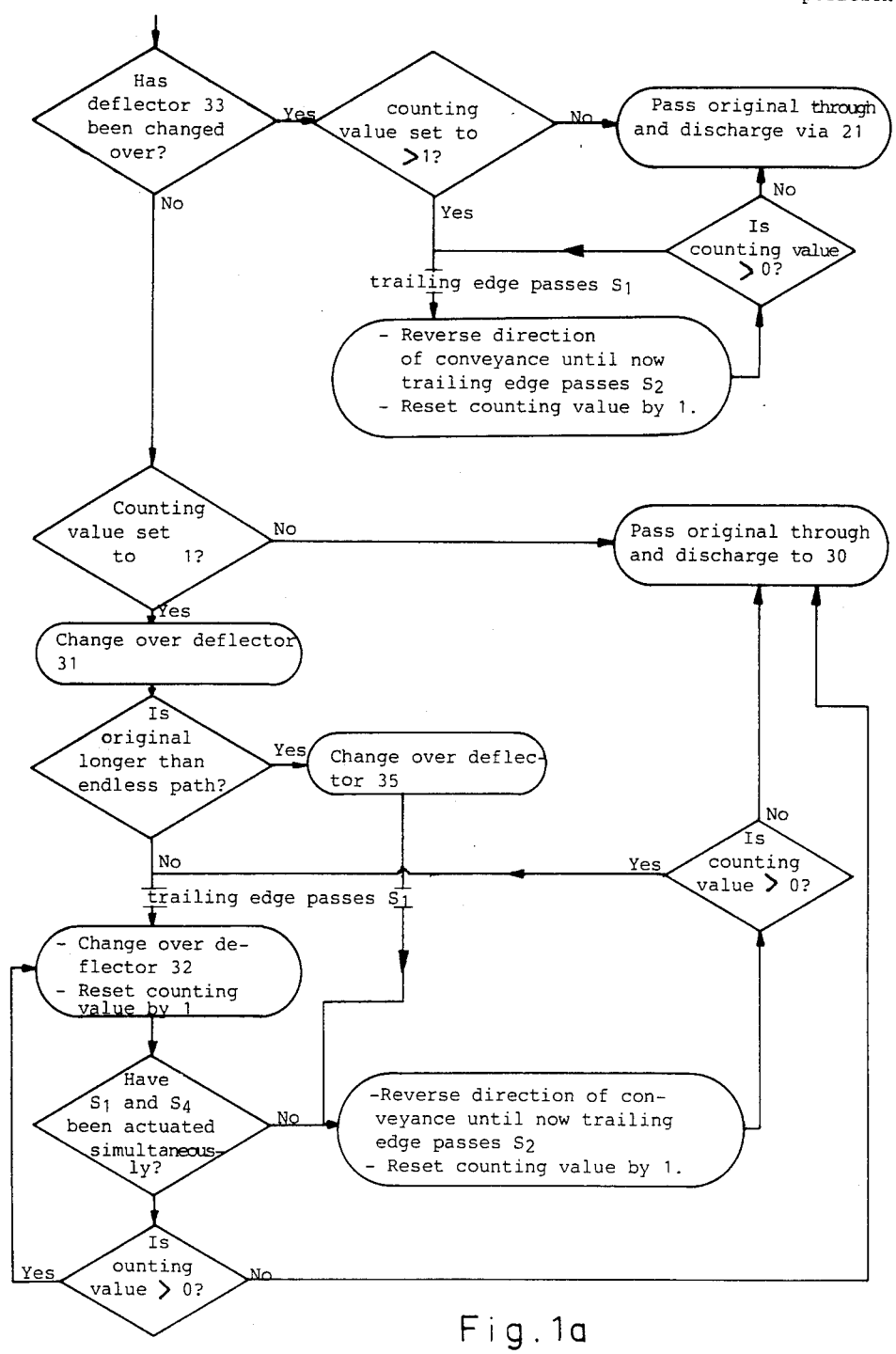
FIG. 1A is a decision diagram with regard to the operation of the exposure device according to FIG. 1.

The operation of the exposure device shown in FIG. 1 is explained with reference to the decision diagram represented in FIG. 1a. In the inoperative position, deflectors 31, 32, 33 and 35 are shown in solidline.

The copying machine's control device (not shown) is set to a counting value corresponding to the number of copies required from an original to be copied. The original to be copied is brought into the conveyor path 8 via table 20. Particularly when the original cannot readily follow a curved path, e.g., because it is completely or partially (suspension strip) too rigid for that purpose, deflector 33 is changed prior to the introduction of the original so that the original will always follow a straight path. If, for example, the counting value is set to 1, the original will be guided along and exposed in the exposure zone and discharged directly via opening 21. If the counting value has been set to more than 1, then when the trailing edge of the original conveying in the direction of the arrow passes the detector $S_1$, a signal will be generated which is fed to the control system. In response to that signal, the drive direction of the conveyor rollers pairs 8a is reversed and the original is fed back, at higher speed if necessary, along path 8 and the counting value reset by the value 1 in the copying machine's control system. When the now trailing edge of the original passes detector $S_2$, a signal is generated which is fed to the control system, in response to which the drive direction of the pairs of conveyor 8a is reversed and the initial direction in which the original was introduced is restored.

If deflector 33 has not been changed and if the counting value set is 1, then the exposed original is conveyed directly via path 29 into collecting tray 30. However, if the counting value set is more than 1, then prior to copying deflector 31 is changed in response to the signal delivered by the control device.

If, when the trailing edge of the original passes detector $S_3$ but the leading edge of the original has already reached detector $S_4$, indicating that the original does not fit within the endless path, then the control device delivers a control signal in response thereto to change deflector 35.

The reversal of direction of conveyance, which can be repeated several times, and the resetting of the counting value, and so on, including the final discharge of the original, are all effected in a manner corresponding to the method described hereinbefore in respect of a rigid original, except that the original is finally deposited in tray 30.

If both detector $S_3$ and $S_4$, are not simultaneously covered indicating that the original fits within the endless path, then a signal is delivered to the control device to reset the counting value by a value 1 and to change over the deflector 32 when the trailing edge of the original that has been introduced passes detector $S_1$. If, during delivery of this signal, the leading edge of the original has not yet reached detector $S_4$ a signal is also delivered for changing the conveyance direction of conveyor rollers pairs 8a. If, in the latter case, the now trailing edge of the original passes detector $S_2$, then a signal is generated which is fed to the control system, in response to which the drive direction of conveyor rollers pairs 8a is again reversed and the initial position in which the original was introduced restored. Otherwise, the original continues to circulate in the direction of the arrow.

In each of these two cases, when the counting value reaches a value 0, a signal is generated and fed to the control device. In response to that signal the control device changes deflector 31 and the original is passed on in the direction of the arrow and is fed via conveyor path 29 to receiving tray 30

The positioning of detector $S_4$ is selected so that at given speeds $V_1$ and $V_2$ and given distance R between the detectors $S_1$ and $S_2$ it takes an equal length of time for an original of length L to move back in the direction of the arrow to the exposure position (time equal to $(S-R-L) V_1$) or to move back in the reverse direction to the exposure position (time equal to $(L+R) V_2$). It is possible to derive from $(S-R-L) V_1=(L+R) V_2$:

$$L = \frac{V_1}{V_1 + V_2} \cdot S - R$$

an original shorter than the length L is taken back for repeated exposure and an original longer than this length is taken further into the endless conveyor path for a repeated exposure.

After the last exposure of an original, another original can be directly introduced and exposed with virtually no interruption. The copying machine represented in FIG. 1 readily can be arranged for the introduction of receiving material via original input table 20, e.g., each time before an original to be copied is introduced via table 20. To this end, a connecting path 36 is provided between the original conveyor path 8 and the conveyor path in which receiving material is conveyed from tray 11 or from reel 12 to image transfer station 5. Path 36 is accessible via deflector 37.

Although the copying machine represented in FIG. 1 can reach a high copying capacity with numerous changes of originals, it has the disadvantage that only one endless conveyor path is available for the repeated copying of originals longer than the length L. Faster operation is possible for the repeated exposure of relatively long originals if a number of endless conveyor paths is available in lengths corresponding to the number of frequently occurring relatively large original sizes. In this respect, FIG. 2 represents copying machine having an exposure device according to the invention, by means of which originals of relatively considerable lengths can automatically be selectively fed to one of a number of endless conveyor paths.

Referring to FIG. 2 the largest endless conveyor path is formed, as in the copying machine according to FIG. 1, by two straight path portions 25 and 26 and two curved path portions 27 and 28 and has a length, for example, of 1200 mm. Introduction table 20 joins the top straight path portion 26. The exposure zone with the pairs of conveyor rollers 8a is situated at that end of the bottom path portion 25 which is remote from the operating side 16. The direction of conveyance of an original during exposure is indicated by the arrow.

Conveyor path 34 for originals longer than the length of the longest endless path joins the other end of the bottom straight path portion 25. Curved path portions 37 and 38 are provided between the straight path portions 25 and 26 in order to form endless conveyor paths of lengths of 840 and 600 mm, respectively. Paths 37 and 38 are accessible via deflectors 39 and 40, respectively, when they are in the position shown in broken-line. Deflector 40 is set to this position by the control device of the copying machine in response to a signal delivered upon the passage of the trailing edge of an original past detector $S_3$, but the leading edge of which has not yet reached detector $S_5$ which is preferably located a distance of 600 mm from detector $S_3$. Deflector 39 is set in the position shown in broken-line by the control device, when upon the passage of the trailing edge past detector $S_3$, the leading edge has reached detector $S_5$, but has not yet reached a detector $S_6$ situated at a distance of 840 mm from detector $S_3$, for example.

Apart from the use of a plurality of circulation paths and face-up introduction, the operation of the exposure device according to FIG. 2 is virtually the same as the operation of the exposure device according to FIG. 1. The difference is that immediately after each last exposure of an original, hence even in the case of an original that is exposed only once, the drive direction of the conveyor rollers 8a is reversed so as to discharge the original via conveyor path 29. This latter feature means that on a change of originals copying is subject to some delay. It is not possible to use inflexible originals.

FIG. 3 represents a copying machine with another embodiment of the exposure device according to the invention in which relatively long originals can be automatically guided into one of a number of circulation paths as in FIG. 2, but in which it is possible to use inflexible originals.

To this end, detectors $S_5$ and $S_6$ are disposed, for example, at distances of 600 mm and 840 mm, respectively, from detector $S_1$ measured in the direction of introduction along the maximum circulation path. Conveyor path 29 along which a finished original is conveyed to collecting tray 30 joins the curved portion 28 of the endless conveyor path. Prior to copying, an original is conveyed to a position past detector $S_2$. During the following exposure, the original is moved past the exposure station in the direction of the arrow. On the last exposure, deflector 31 is changed over and the original is deposited in receiving tray 30 on the operating side via conveyor path 29 so that it can be readily removed.

Figure 4:
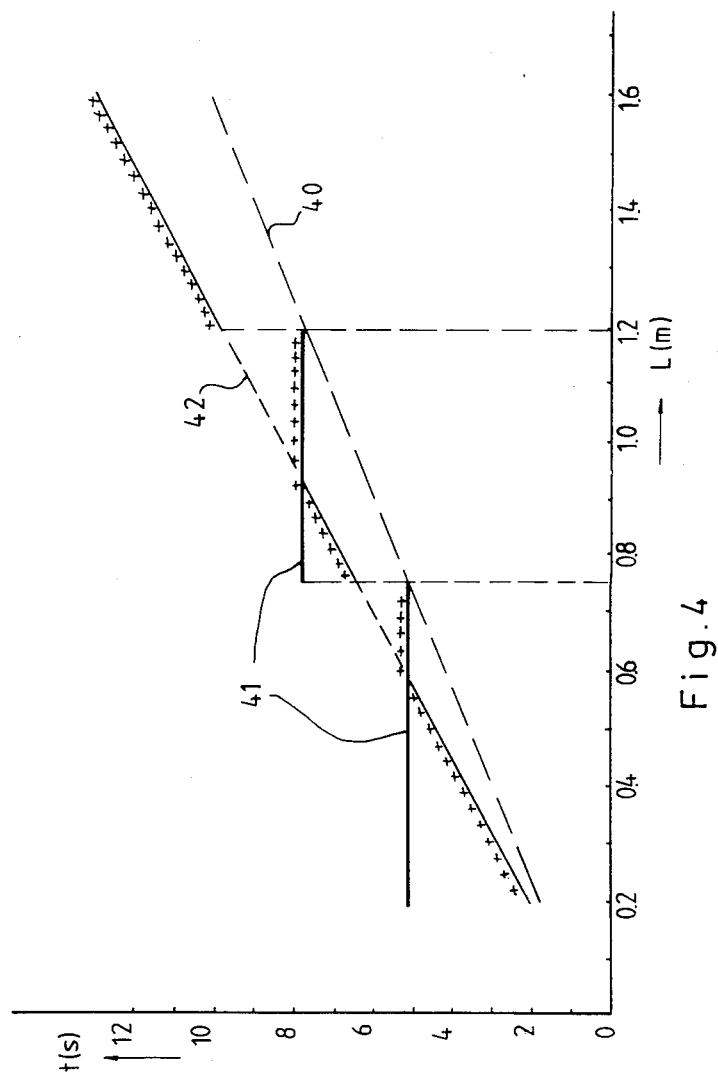
FIG. 4 is a graph comprising the time required to performing an exposure of a original as a function of the length thereof according to the prior art and the present invention.

FIG. 4 represents the cycle time required for an original requiring repeated exposure to be exposed once as a function of the length of said original. Line 40 illustrates cycle times for the ideal situation in which each original exposed at a speed of 10 m/min would have an endless conveyor path of a length corresponding to the length of the original concerned. Line 41 illustrates the cycle times for a copying machine according to the prior art, in which one relatively long and one relatively short endless conveyor path are provided. Line 41 consists of two horizontal line portions. The ideal situation is achieved only at places where these portions coincide with line 40. The cycle time is very unfavorable in the case of originals much shorter than the endless conveyor path in which they have to move.

Straight line 42 illustrates the cycle times for a copying machine in which the originals for repeated exposure are returned at accelerated speed along the same path after each exposure. The lines indicated with plus signs illustrate the cycle times achieved in a copying machine according to the invention. The shortest originals, shorter than 600 mm in the example, are given an accelerated return movement for retention purposes. Somewhat longer originals, of a length between 600 mm and 750 mm in the example, are circulated in the shorter endless conveyor path for retention. Even longer originals, of a length between 750 mm and 1200 mm in the example, are kept in the longer endless conveyor path for retention, originals of a length between 750 mm and approximately 900 mm being given an accelerated return movement each time and originals of a length between 900 mm and 1200 mm being circulated. It will be apparent that the ideal situation according to line 40 is increasingly approached with an increasing number of endless paths over the two shown in FIG. 4. Originals longer than the 1200 mm, the length of the longest endless path, are given an accelerated return movement for retention.

FIG. 4 disregards the influence that the changes of originals can have on the cycle times. As already indicated, this adverse effect is relatively greater in the case of copying machines represented in FIGS. 2 and 3, in which the conveyor path is blocked by a returning original respectively after and before a series of exposures of an original.

While presently preferred embodiments of the invention have been shown and described, the invention may be otherwise embodied within the scope of the appended claims.

What is claimed is:

1. An exposure device for originals, comprising an exposure station, a first endless conveyor path for repeatedly passing an original through said exposure station with the aid of a conveyor; reversible drive means for driving said conveyor, selectively switchable discharge means for discharging originals from said first endless conveyor path, first original measuring means for determining whether the length of said original on said conveyor is larger or smaller than a predetermined value and providing an output control signal when said length is smaller than said value; and control means connected to said measuring means for controlling said drive means such that in response to said control signal the control means controls at the time when said original has passed through said exposure station the reversal of said drive means and the time required to return the entire original back through said exposure station.

2. An exposure device according to claim 1, including at least a second conveyor path positioned to follow said first conveyor path; a deflector element positioned to guide an original from said first conveyor path to said second conveyor path; and adjusting means for actuating said deflector element, wherein said control means provides a control signal when said adjusting means have been actuated.

3. An exposure device according to claim 2, including second measuring means for determining whether the length of a conveyed original is greater or smaller than a value corresponding to the length of said first conveyor path and which actuates said adjusting means if the determined length is greater than said length.

4. An exposure device according to claims 1, 2 or 3, wherein the speed at which said conveyor takes an exposed original back through said exposure station is greater than the speed at which it conveys said original through the exposure in the direction of passage.

5. An exposure device according to claims 1, 2 or 3, wherein said first measuring means comprises (a) first detector positioned at an exit of said exposure station and delivering a first signal in response to the passage of the trailing edge of an original leaving said exposure station, (b) a second detector positioned a distance L from the exit of said exposure station delivering a second signal in response to the leading edge of said original, where:

$$L = \frac{V_1}{V_1 + V_2} S - R,$$

where $V_1$ is the speed of said first conveyor passage, $V_2$ is the speed of said first conveyor in reverse direction; S is the length of the first conveyor path and r the length of said exposure station, and (c) a circuit connected to said first detector and to said second detector and which provides said control signal if the first signal is generated in the absence of the second signal.

6. An exposure device according to claims 3 or 5, wherein said second measuring means comprises a second detector and a third detector, said third detector positioned in front of said exposure station; the distance between said second and third detectors corresponding to the length of said first conveyor path, and wherein said second conveyor path is positioned past the third detector.

7. An exposure device according to claims 1, 2 or 3, wherein in the absence of an original in said first conveyor path, said means for driving the conveyor drives the conveyor in a return direction opposite to the direction of passage in order to convey into said conveyor path an original which, as considered in the return direction in front of said exposure station, has been brought into the conveyor path.

8. An exposure device according to claim 7, wherein after expiration of the period during which the means for driving said conveyor conveys said original to a position past said exposure station said means are deactivated wherein the said means are thereafter reactivated by an activating signal fed thereto.

9. An exposure device according to claims 4, 5 or 6, wherein in the absence of an original in said first conveyor path, said means for driving the conveyor drives the conveyor in a return direction opposite to the direction of passage in order to convey into said conveyor path a original which, as considered in the return direction in front of said exposure station, has been brought into the conveyor path.

10. An exposure device according to claim 9, wherein after expiration of the period during which the means for driving said conveyor conveys said original to a position past said exposure station said means are deactivated wherein the said means are thereafter reactivated by an activating signal fed thereto.

* * * * *